(12) United States Patent
Ye et al.

(10) Patent No.: US 10,860,546 B2
(45) Date of Patent: Dec. 8, 2020

(54) TRANSLATION OF SOURCE M-NODE IDENTIFIER TO TARGET M-NODE IDENTIFIER

(71) Applicant: HEWLETT PACKARD ENTERPRISE DEVELOPMENT LP, Houston, TX (US)

(72) Inventors: Manny Ye, Andover, MA (US); Vitaly Oratovsky, Newton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 590 days.

(21) Appl. No.: 15/574,798

(22) PCT Filed: May 28, 2015

(86) PCT No.: PCT/US2015/032827
§ 371 (c)(1),
(2) Date: Nov. 16, 2017

(87) PCT Pub. No.: WO2016/190870
PCT Pub. Date: Dec. 1, 2016

(65) Prior Publication Data
US 2018/0143997 A1    May 24, 2018

(51) Int. Cl.
*G06F 17/30* (2006.01)
*G06F 16/182* (2019.01)
*G06F 16/27* (2019.01)
*G06F 11/14* (2006.01)
*G06F 3/06* (2006.01)
*G06F 11/20* (2006.01)

(52) U.S. Cl.
CPC .......... *G06F 16/1844* (2019.01); *G06F 3/065* (2013.01); *G06F 11/14* (2013.01); *G06F 16/184* (2019.01); *G06F 16/27* (2019.01); *G06F 11/2094* (2013.01)

(58) Field of Classification Search
None
See application file for complete search history.

(56) References Cited

U.S. PATENT DOCUMENTS

| | | |
|---|---|---|
| 5,117,351 A | 5/1992 | Miller |
| 6,374,252 B1 | 4/2002 | Althoff et al. |
| 6,839,769 B2 | 1/2005 | Needham et al. |

(Continued)

FOREIGN PATENT DOCUMENTS

| | | |
|---|---|---|
| WO | WO-2015031540 | 3/2015 |
| WO | WO-2016073019 | 12/2016 |

OTHER PUBLICATIONS

Anonymous, "Simpleflake: Distributed ID generation for the lazy," Aug. 12, 2013, <http://engineering.custommade.com/simpleflake-distributed-id-generation-for-the-lazy/>.

(Continued)

*Primary Examiner* — Hung D Le
(74) *Attorney, Agent, or Firm* — Hewlett Packard Enterprise Patent Department (57) ABSTRACT

Examples include translation of a source m-node identifier (ID) to a target m-node ID, the source m-node ID identifying a source m-node representing a file system object in a source file system, and the source m-node ID including a source replication set ID, a source m-node container ID, and at least one local ID. In examples, a source m-node container ID is replaced with a target m-node container ID in the target m-node ID.

15 Claims, 4 Drawing Sheets

(56) References Cited

U.S. PATENT DOCUMENTS

| | | | |
|---|---|---|---|
| 7,430,570 B1 | 9/2008 | Srinivasan et al. | |
| 7,752,226 B1 | 7/2010 | Harmer et al. | |
| 8,010,514 B2 | 8/2011 | Zhang et al. | |
| 8,078,816 B1 | 12/2011 | Thoppai et al. | |
| 8,229,985 B2 | 7/2012 | Turner et al. | |
| 8,396,895 B2 | 3/2013 | Miloushev et al. | |
| 8,478,799 B2 | 7/2013 | Beaverson et al. | |
| 8,504,597 B2 | 8/2013 | Pitts | |
| 8,812,450 B1 | 8/2014 | Kesavan et al. | |
| 9,613,119 B1* | 4/2017 | Aron | H04L 69/40 |
| 10,521,403 B1* | 12/2019 | Hupfeld | G06F 11/2094 |
| 2004/0267843 A1 | 12/2004 | Dinh et al. | |
| 2005/0278385 A1 | 12/2005 | Sutela et al. | |
| 2010/0185682 A1 | 7/2010 | Grinshpun et al. | |
| 2010/0199042 A1* | 8/2010 | Bates | G06F 11/2064 711/114 |
| 2011/0016085 A1 | 1/2011 | Kuo et al. | |
| 2013/0054822 A1* | 2/2013 | Mordani | H04L 69/40 709/228 |
| 2013/0173546 A1 | 7/2013 | Cline et al. | |
| 2013/0325804 A1* | 12/2013 | Bachar | G06F 16/164 707/634 |
| 2014/0019413 A1 | 1/2014 | Braam et al. | |
| 2014/0304231 A1* | 10/2014 | Kamath | G06F 16/27 707/634 |
| 2015/0066857 A1* | 3/2015 | Dayal | G06F 16/128 707/639 |
| 2016/0004877 A1* | 1/2016 | Hayes | H04L 9/0861 713/165 |
| 2016/0140201 A1* | 5/2016 | Cowling | G06F 11/14 707/614 |

OTHER PUBLICATIONS

Chaurasia et al., "Generating a Unique Identifier for an Object in a Distributed File System," Patent application filed as India 5519/CHE/2014, Nov. 4, 2014, and as PCT/US2015/010238 Jan 6, 2015.

Diegocalleja, "Ext4 Howto," Jan. 17, 2014, <https://ext4.wiki.kernel.org/index.php/Ext4_Howto>.

Kellan Elliott-McCrea, "Ticket Servers: Distributed Unique Primary Keys on the Cheap," Feb. 8, 2010, <http://code.flickr.net/2010/02/08/ticket-servers-distributed-unique-primary-keys-on-the-cheap/>.

Malik, W.R., A Distributed Namespace for a Distributed File System, (Research Paper), Aug. 7, 2012, 46 pps, http://www.diva-portal.org/smash/get/diva2:548037/FULLTEXT01.pdf.

Mathur et al., "The new ext4 filesystem: current status and future plans," Jun. 27-30, 2007, Proceedings of the Linux Symposium, vol. Two, pp. 21-34, <https://www.kernel.org/doc/ols/2007/ols2007v2-pages-21-34.pdf>.

Mike Krieger, "Sharding & IDs at Instagram," Oct. 7, 2011, <http://web.archive.org/web/20111007021145/http://instagram-engineering.tumblr.com/post/10853187575/sharding-ids-at-instagram>.

Morris et al., "[RFC] inode generation numbers.," Feb. 22-23, 1999, <http://www.gossamer-threads.com/lists/linux/kernel/63467>.

P. Leach et al., "A Universally Unique IDentifier (UUID) URN Namespace," Request for Comments: 4122 (RFC 4122), Jul. 2005, <http://tools.ietf.org/pdf/rfc4122.pdf>.

Ryan King, "Announcing Snowflake," Jun. 1, 2010, <https://blog.twitter.com/2010/announcing-snowflake>.

Wikipedia, "Address (geography)," Apr. 29, 2015, <http://en.wikipedia.org/wiki/Address_(geography)>.

Wikipedia, "Follow-the-sun," Feb. 27, 2015, <http://en.wikipedia.org/wiki/Follow-the-sun>.

Wikipedia, "Globally unique identifier," Apr. 18, 2015, <http://en.wikipedia.org/wiki/Globally_unique_identifier>.

Wikipedia, "inode," Feb. 18, 2015, <http://en.wikipedia.org/wiki/Inode>.

Wikipedia, "XFS," Jan. 2, 2015, <http://en.wikipedia.org/wiki/XFS>.

International Search Report & Written Opinion received in PCT Application No. PCT/US2015/032827, dated Mar. 31, 2016, 9 pages.

* cited by examiner

TRANSLATION OF SOURCE M-NODE IDENTIFIER TO TARGET M-NODE IDENTIFIER

BACKGROUND

A computer system may store data in a file system, and loss of such data resulting from a failure, disaster, or other event affecting the file system, for example, may be detrimental to an enterprise, individual, or other entity utilizing the file system. To protect the data from loss, a data replication system may replicate data in a file system implemented on computing device(s) at a first physical location to a file system implemented on computing device(s) at a second physical location, for example. In such examples, if a failure or other event prevents retrieval of some portion of the data of the file system at the first location, it may be possible to retrieve the data from the file system at the second location.

BRIEF DESCRIPTION OF THE DRAWINGS

The following detailed description references the drawings, wherein.

DETAILED DESCRIPTION

A file system may store files, directories, or other "file system objects". In some examples, the file system may also maintain a container (i.e., data structure) of m-nodes separate from the file system objects that represent the file system objects, respectively, such that each file system object is represented by an m-node in the container. In examples described herein, an "m-node" (or "meta-node") may be a data structure of a file system that represents a separate file system object (e.g., a file, directory, etc.) of the file system, and may comprise metadata about the file system object. The metadata may include information regarding ownership, permissions, size, etc., related to the file system object. In some examples, an m-node may include the storage location(s) (i.e., in a storage device) of the content of the file system object represented by the m-node. Examples of m-nodes may include inodes, vnodes, or the like. In examples, m-nodes may be utilized by a file system for various purposes, such as finding the location of the content of a represented file, storing metadata for a represented file or directory, etc.

Each of the m-nodes of a file system may be identified by an m-node identifier (ID), and it may be desirable for each m-node in the file system to have an m-node ID that is unique in the file system (i.e., not shared by any other m-node in the file system). Otherwise, if two m-nodes share the same m-node ID, data in the file system may become corrupted as, for example, data intended for one file may be written to a different file when those files are represented by respective m-nodes sharing the same m-node ID.

In some examples, m-node IDs may be constructed to include "local ID(s)" that collectively provide sufficient information to provide m-node ID uniqueness within a single file system. For example, one local ID may be a location ID, which may be a location at which the m-node is stored on a physical storage device when the m-node is created, or may be based on that location. In some examples, the location at which the m-node is stored when created may be a location at which another m-node was previously created (e.g., another m-node that has since been deleted). In such examples, another local ID may be a generation ID used to disambiguate different m-nodes created at the same location at different times. For example, the generation ID for a particular location may be incremented each time an m-node is created at that location, such that each m-node created at the location receives a different generation ID, to distinguish different m-nodes created at the same location.

In some examples, a file system implemented using multiple physical storage devices (which may be referred to as "segments" herein), as such location and generation ID may collide across different segments. In such examples, the file system may associate a unique segment ID to each segment of the file system, and the segment ID of the segment on which an m-node is created may serve as another local ID for the m-node. As such, in the examples described above, each m-node may be uniquely identified in a local file system by an m-node ID including a combination (e.g., a concatenation) of segment ID, location ID, and generation ID, such as <segment ID|location ID|generation ID>.

However, the local IDs of segment ID, location ID, and generation ID may not be sufficient to uniquely identify an m-node across different file systems, as different file systems may each use similar segment IDs, location IDs, and generation IDs. As such, relying on the local IDs may allow for collisions when replicating m-nodes (and their associated content) from one file system to another (e.g., for purposes of backing up data in case of failure or disaster).

To address these issues, examples described herein may utilize m-node IDs including replication set IDs and m-node container IDs in addition to local IDs. Regarding m-node container IDs, in examples described herein, m-nodes of a file system may be organized in at least one "m-node container," which may be a data structure to contain m-node(s) representing file system objects in a file system. As an example, an m-node container may be a tree data structure of m-nodes representing file system objects. In some examples, each m-node data structure of a file system may be identified by an identifier, referred to herein as an "m-node container ID". The m-node container ID of an m-node container of a file system may be unique among the m-node containers of the file system (that is, the m-node container ID is not shared by any other m-node container of the same file system). In examples described herein, an m-node ID may include the m-node container ID of an m-node container in which it was created, in addition to local ID(s) described above.

However, in an example where m-node containers (and their underlying content) are replicated from multiple different source file systems to a single target file system (i.e., "M-to-1" replication), m-node IDs including m-node container IDs and local IDs may still collide when the different source file systems have m-node container(s) with the same m-node container ID (since the m-node container IDs are unique within a file system, but not across different file systems). For example, in a simple example for purposes of illustration, consider m-node IDs having the format <m-node container ID|segment ID|location ID|generation ID>. In such examples, an m-node on a first file system may have an m-node ID<0|0|0|0> (or "0000"), and another m-node on a second file system may also have m-node ID<0|0|0|0> (or "0000"), where each file system has an m-node container with ID "0", a segment with ID "0", and a location "0" available with generation ID "0". While each of these m-node IDs may be unique within its own file system, they may collide if replicated to the same target file system.

To address these issues, when replicating m-nodes of a source m-node container (and the underlying content) from a source file system to a target file system, examples described herein may create, on the target file system, a new target m-node container identified by a target m-node container ID that is unique among m-node containers on the target file system, and may replicate the m-nodes from the source m-node container to the target m-node container. When replicating an m-node in this manner, examples described herein may also translate a source m-node ID of the source m-node to a target m-node ID for the target m-node (i.e., that replicates the source m-node), the translation including replacement of the source m-node container ID of the source m-node container with the target m-node container ID.

In this manner, m-nodes from different source file systems, whose m-node IDs (if left unchanged) might collide when replicated onto the target file system, are each stored in different m-node containers having different m-node container IDs on the target file system and the m-node IDs for the replicated m-nodes are translated to include the different m-node container IDs of the different target m-node containers they are replicated to, respectively, such that the m-node IDs of the replicated m-nodes on the target file system do not collide. For example, continuing the above example, examples described herein may replicate a first m-node from a first source file system and having an m-node ID "0000" (i.e., <0|0|0|0>) to a new target m-node container having a unique m-node container ID of "1" on the target file system, and may translate the m-node ID of the first m-node from "0000" to "1000" (<1|0|0|0>) (replacing the source m-node container ID "0" with the target m-node container ID "1"). Examples may further replicate a second m-node from a second source file system and having m-node ID "0000" (<0|0|0|0>) to another target m-node container having a unique m-node container ID of "2" on the target file system, and may translate the m-node ID of the second m-node from "0000" to "2000" (<2|0|0|0>) (replacing the source m-node container ID "0" with the target m-node container ID "1"). In this manner, in examples described herein, the m-node IDs of the replicated m-nodes do not collide on the target file system in "M-to-1" replication. The above described example techniques would also be effective to avoid collisions in "1-to-1" replication from one source to one target file system, and in "1-to-N" replication from one source to multiple target file systems.

However, for an around-the-sun replication, in which different file systems may replicate to one another in turn (each taking turns being the active file system updating and/or creating file(s), director(ies)), files created on the different file systems may collide when replicated. Continuing the above example, consider the m-node created on the first source file system with m-node ID "0000" (i.e., <0|0|0|0>), then translated to "1000" (i.e., <1|0|0|0>) when replicated to the target file system. This m-node was not created on the target file system, so segment "0", and location "0" with generation "0" may still be available on the target file system for creation of a new m-node in the target m-node container with ID "1", so that, when the target file system is active, a new m-node with m-node ID "1000" (i.e., <1|0|0|0>) may be created on the target file system, which would collide with the replicated m-node on the target file system, and would collide with the original m-node when replicated back to the first source file system.

To address these issues, examples described herein may utilize m-node IDs including replication set IDs in addition to m-node container IDs and local IDs. In examples described herein, a "replication set" is a set of m-node containers which includes a source m-node container being replicated, and all of its target m-node containers replicated on other file systems. In examples described herein, each m-node container that is a member of a given replication set is associated with an identifier (referred to herein as a "replication set identifier") that is unique among the m-node containers of the replication set. For example, continuing the above example, the source m-node container of first source file system may have a replication set ID of "0" (which may indicate that it is the original source m-node container). When replication is requested for the first source file system, examples described herein may assign the target m-node container on the target file system a different replication set ID from that of the source m-node container, for example a replication set ID of "1". In such examples, m-node IDs may be provided having the format <replication set ID|m-node container ID|segment ID|location ID|generation ID>, the m-node ID including the replication set ID of the m-node container in which it was created.

In such examples, the m-node on the original source m-node container may have an m-node ID of "00000" (i.e., <0|0|0|0|0>). In examples described herein, the translation of m-node IDs does not change the replication set ID. As such, when replicating the m-node to the target file system, examples described herein may translate the m-node ID from "00000" (i.e., <0|0|0|0|0>) to "01000" (i.e., <0|1|0|0|0>), replacing the source m-node container ID ("0") with the m-node container ID of the target m-node container ("1"). In this example, an m-node created on the target m-node container (with m-node container ID "1") is given the replication set ID "1", and as such does not collide as in the example above, as it may result in an m-node ID of "11000" (i.e., <1|1|0|0|0>), which would not collide on the target file system with the replicated m-node, and, if replicated to the source m-node container on the source file system would not collide with the original m-node even after m-node ID translation, as examples described herein would translate the m-node ID for the m-node created on the target file system from "11000" (i.e., <1|1|0|0|0>) to "10000" (i.e., <1|0|0|0|0>, the m-node container ID being translated from "1" to "0"), which still differs from the original m-node on the source file system because of the replication set ID ("1"), which identifies which m-node container of the replication set the m-node was created in.

Accordingly, examples described herein may acquire an indication to replicate a file system object of a source file system on a target file system, the indication comprising a source m-node ID identifying a source m-node representing the file system object in the source file system, wherein the source m-node ID comprises a source replication set ID, a source m-node container ID identifying a source m-node container of the source file system including the source m-node, and at least one local ID. Examples described herein may translate the source m-node ID to a target m-node ID, the translation including replacement of the source m-node container ID of the source m-node ID with a target m-node container ID identifying a target m-node container of the target file system and maintaining, in the target m-node ID, the replication set ID and the at least one local ID of the source m-node ID. Examples may further create a target m-node identified by the target m-node ID in the target m-node container.

In this manner, examples described herein may provide data replication across file systems such that m-node IDs do not collide, for replication schemes replicating data of one source file system to one target file system ("1-to-1"), replicating data of one source file system to many different target file system ("1-to-N"), replicating data of many different source file system to a single target file system ("M-to-1"), and replicating between different file systems in an "follow-the-sun" replication model. In addition, examples described herein provide this disambiguation of m-node IDs in a highly efficient manner, without any mapping of each individual m-node ID on a source file system to each individual translated m-node ID on a target file system, without a globally centralized provision of m-node IDs, and without coordination after establishment of a target m-node container for replication, for example.

Although, for ease of illustration and description, examples described herein may use single-digit constituent IDs making up m-node IDs, in examples described herein, each constituent ID may be any suitable number of digits in length and may be in any suitable format (e.g., binary, hexadecimal, decimal, etc.). For example, in some examples described herein, an m-node ID may be a 128-bit binary identifier comprising a 4-bit replication set ID, a 28-bit m-node container ID, a 16-bit segment ID, a 48-bit location ID, and a 32-bit generation ID. In some examples, an m-node ID may be a concatenation of the constituent IDs into a single number or string without delimiters. In other examples, the constituent IDs may be combined in any suitable manner.

Figure 1:
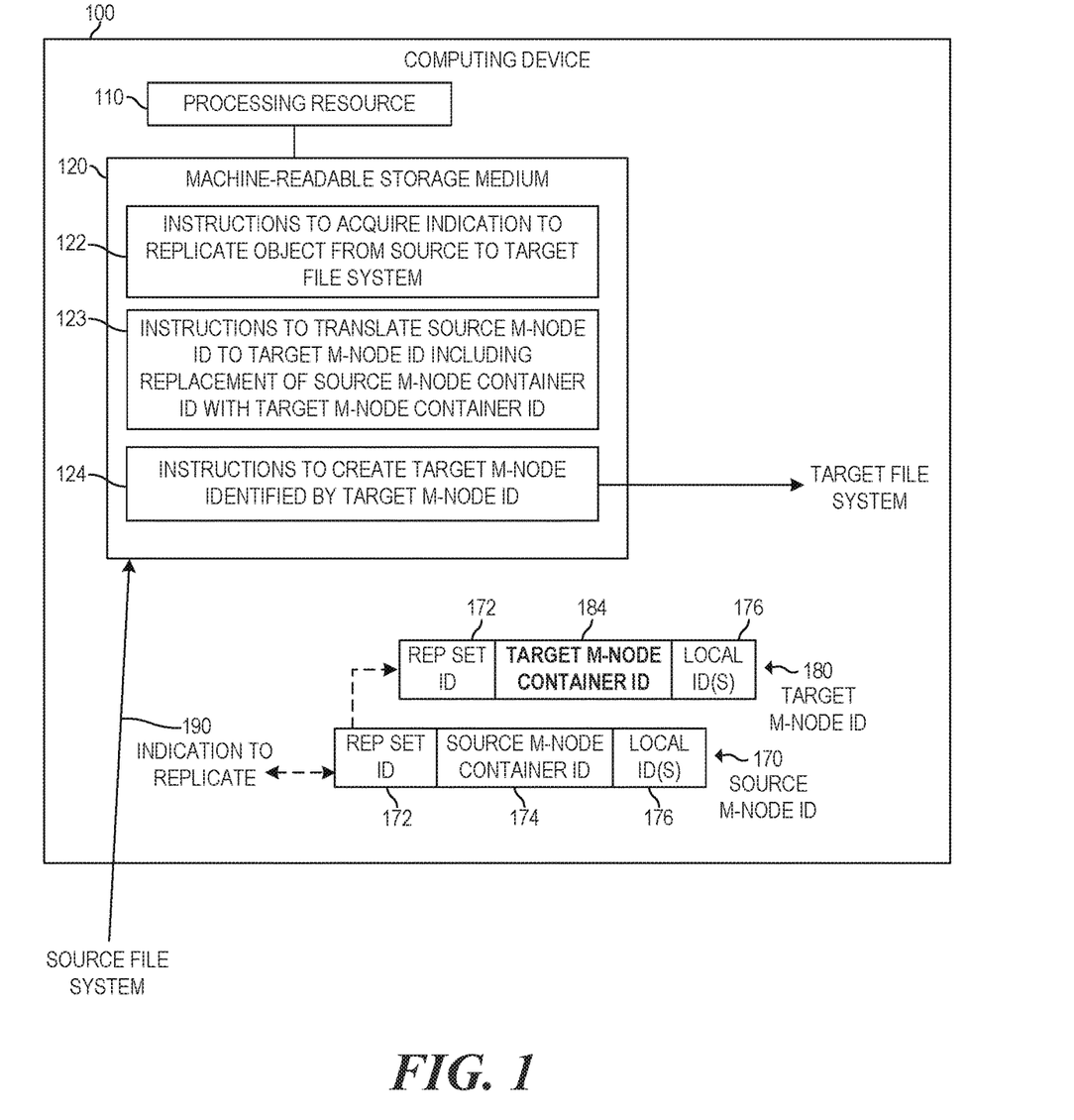
FIG. 1 is a block diagram of an example computing device including instructions to translate a source m-node identifier (ID) to a target m-node ID.

Referring now to the drawings, FIG. 1 is a block diagram of an example computing device 100 including instructions to translate a source m-node identifier (ID) to a target m-node ID. Computing device 100 includes a processing resource 110 and a machine-readable storage medium 120 comprising (e.g., encoded with) instructions 122-124 executable by processing resource 110 to implement functionalities described herein in relation to FIG. 1. In some examples, storage medium 120 may include additional instructions. In other examples, the functionalities described herein in relation to instructions 122-124, and any additional instructions described herein in relation to storage medium 120, may be implemented as engines comprising any combination of hardware and programming to implement the functionalities of the engines, as described below. As used herein, a "computing device" may be a server, blade enclosure, desktop computer, laptop (or notebook) computer, workstation, tablet computer, mobile phone, smart device, or any other processing device or equipment including a processing resource. In examples described herein, a processing resource may include, for example, one processor or multiple processors included in a single computing device or distributed across multiple computing devices.

In the example of FIG. 1, instructions 122 may acquire an indication 190 to replicate a file system object of a source file system on a target file system. The indication 190 may comprise a source m-node ID 170 identifying a source m-node representing the file system object (e.g., file, directory, etc.) in the source file system. Source m-node ID 170 may comprise a source replication set ID 172, a source m-node container ID 174 identifying a source m-node container of the source file system including the source m-node, and at least one local ID 176.

In some examples, in response to acquisition of indication 190, instructions 123 may translate source m-node ID 170 to a target m-node ID 180. In some examples, as part of the translation, instructions 123 may replace source m-node container ID 174 of source m-node ID 170 with a target m-node container ID 184 identifying a target m-node container of the target file system in which the target m-node is to be placed. In the translation, instructions 123 may also maintain the replication set ID 172 and the at least one local ID 176 of source m-node ID 170, such that the replication set ID 172 and the at least one local ID 176 remain in the target m-node ID 180. In such examples, as shown in the example of FIG. 1, instructions 123 may translate source m-node ID 170 including source replication set ID 172, source m-node container ID 174, and local ID(s) 176 to a target m-node ID including source replication set ID 172, target m-node container ID 184, and local ID(s) 176.

In an example, source m-node ID 170 may have a format such as <replication set ID|m-node container ID|segment ID|location ID|generation ID>, where source replication set ID 172 is "0", source m-node container ID 174 is "0", and local IDs 176 include a segment ID "0", a location ID "0", and a generation ID "0", such that source m-node ID 170 in this example is "00000". In an example, the target m-node container ID 184 may be "1". In such examples, instructions 123 may translate the source m-node ID 170 of "00000" to a target m-node ID 180 of "01000".

In some examples, instructions 124 may directly or indirectly create a target m-node identified by target m-node ID 180 in the target m-node container. For example, instructions 124 may directly create the target m-node in the target file system, or may cause the target file system (or another agent, functionality, or the like) to create the target m-node in the target m-node container of the target file system. The target m-node may be created such that it is identified in the file system by the target m-node ID 180 and stores the target m-node ID 180.

In some examples, indication 190 may further comprise content of the file system object represented by the source m-node. In such examples, instructions 124 may further directly or indirectly store the content of the file system object in the target file system in association with the created target m-node identified by target m-node ID 180. In examples described herein, for instructions, engines, or the like to "indirectly" perform an action in a file system may include causing (e.g., instructing) the file system to perform the action, or causing (e.g., instructing) another agent (e.g., instructions, engine(s), functionality) to perform the action.

In some examples, instructions 122 may acquire indication 190 from an agent operating on behalf of or otherwise in association with a source file system, such as a data replication agent for the source file system. In such examples, the data replication agent may be implemented by processor-executable, machine-readable instructions, engines comprising any combination of hardware and programming, or a combination thereof. In some examples, the data replication agent for the source file system may provide the indication to instructions 122 in response to a determination that the file system object is to be replicated to the target file system, such as based on a schedule, in response to user input to a user interface (UI) of an associated data replication system management layer, or the like.

In examples described herein, instructions, engines, etc., may "acquire" information either actively (e.g., by retrieving the information), passively (e.g., by receiving the information), or in any other suitable manner. In some examples, instructions 122-124 may be part of a data replication agent operating for or on behalf of the target file system, and may be at least in part stored and executed on the same computing device as the target file system. In such examples, at least some of the functionalities of instructions 122-124 may be performed by instructions of the target file system. In other examples, at least some of instructions 122-124 may be stored and/or executed on a computing device separate from computing device(s) implementing the target file system.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In examples described herein, computing device 100 may communicate with components implemented on separate computing device(s) via a network interface device of computing device 100. For example, computing device 100 may communicate with the source file system or a data replication agent for the source file system via a network interface device of computing device 100. In examples described herein, a "network interface device" may be a hardware device to communicate over at least one computer network. In some examples, a network interface may be a network interface card (NIC) or the like. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In some examples, instructions 122-124 may be part of an installation package that, when installed, may be executed by processing resource 110 to implement the functionalities described herein in relation to instructions 121. In such examples, storage medium 120 may be a portable medium, such as a CD, DVD, or flash drive, or a memory maintained by a server from which the installation package can be downloaded and installed. In other examples, instructions 122-124 may be part of an application, applications, or component(s) already installed on a computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
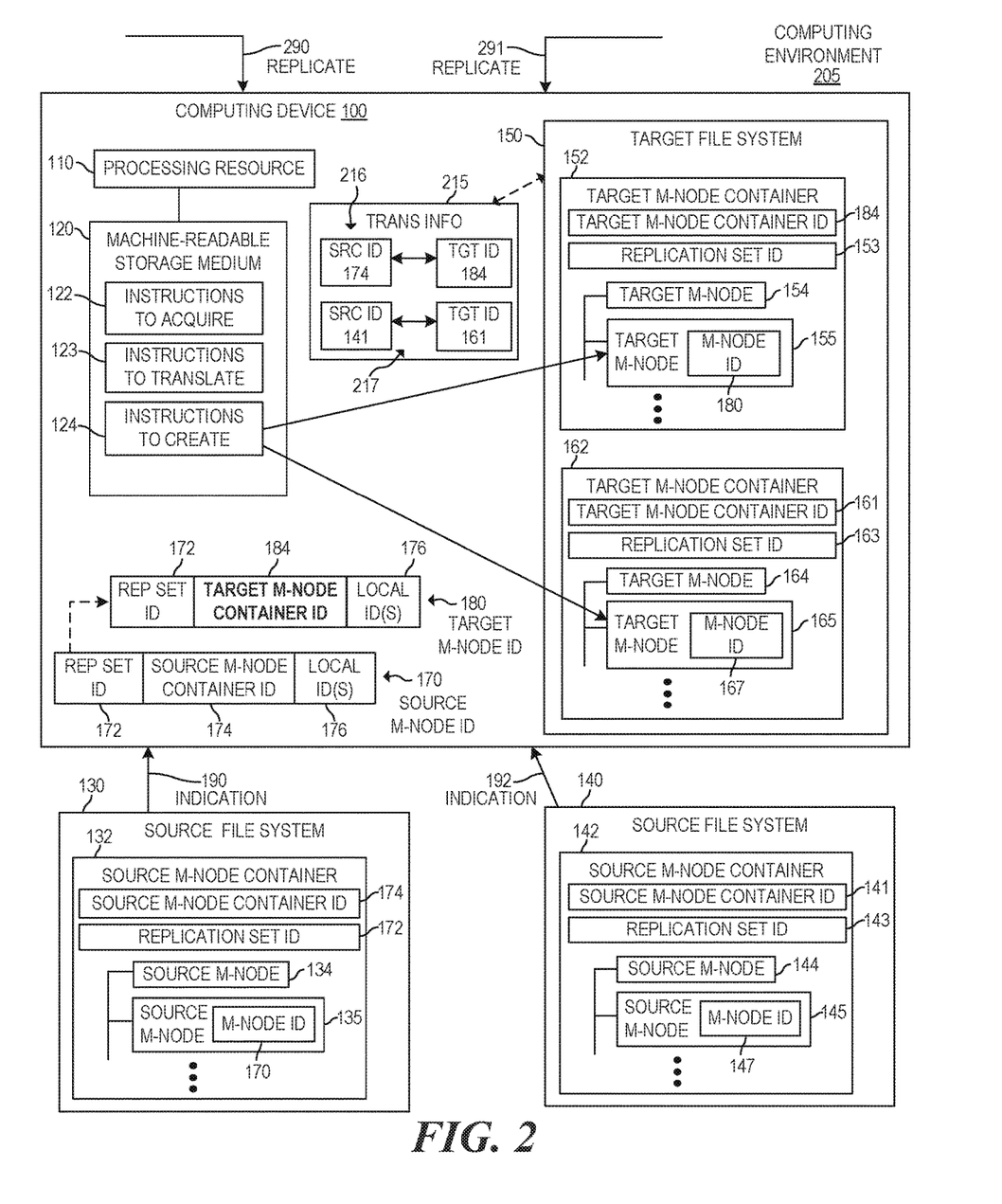
FIG. 2 is a block diagram of an example computing environment including instructions to replace a source m-node container ID of a source m-node ID.

FIG. 2 is a block diagram of an example computing environment 205 including instructions to replace a source m-node container ID of a source m-node ID. In the example of FIG. 2, computing environment 205 includes a computing device 100 as described above in relation to FIG. 1, including processing resource 110, storage medium 120, and instructions 122-124, as described above. In the example of FIG. 2, computing device 100 additionally includes target file system 150, which may be implemented by one or multiple storage devices of or associated with computing device 100 and machine-readable instructions stored and executed at least partially on computing device 100. In other examples, target file system 150 may be implemented by storage devices and machine-readable and executable instructions stored and executed at least partially on computing device(s) separate from computing device 100. In the example of FIG. 2, computing environment 205 may also include a source file system 130, which may be implemented on computing device(s) separate from computing device 100, and which may communicate with computing device 100 via respective network interface devices.

In some examples, instructions 122 may acquire a command 290 to replicate a source m-node container 132 on a target file system 150. In the example of FIG. 2, source file system 130 may include source m-node container 132, which may include a source m-node container ID 174 that uniquely identifies source m-node container 132 in source file system 130 (i.e., among any other source m-node container of source file system 130), a replication set ID 172, and a plurality of source m-nodes 134, 135, etc. In some examples, source file system 130 may include additional source m-node container(s).

In some examples, instructions 122 may acquire command 290 from a management layer of a data replication system associated with file systems 130 and 150, for example, in response to user input to a UI of the management layer indicating a request to replicate at least source m-node container 132 of source file system 130 to target file system 150. In other examples, instructions 122 may acquire command 290 from any other suitable system or component of a data replication system associated with computing environment 205.

In some examples, in response to command 290, instructions 122 may directly or indirectly create a target m-node container 152 to replicate source m-node container 132. For example, instructions 122 may directly or indirectly create, in target file system 150, a target m-node container 152 that is identified by a target m-node container ID 184 that uniquely identifies target m-node container 152 in target file system 150 (i.e., among all of the target m-node containers of target file system 150). In some examples, the target m-node container ID 184 may be stored in the target m-node container 152.

In response to the request to replicate the source m-node container 132 to target file system 150, the management layer or other component may define a replication set including source m-node container 132 having replication set ID 172, and including a target m-node container to be created on the target file system, to which the management layer or other component may assign a target replication set ID 153 different than the source replication set ID 172.

In some examples, command 290 may include the target replication set ID 153 for target m-node container 152, and instructions 122 may directly or indirectly associate the target replication set ID 153 with target m-node container 152 such that the target replication set ID 153 is included in the m-node ID of each non-replication m-node created in target m-node container 152. For example, target replication set ID 153 may be stored in target m-node container 152 (e.g., when target m-node container 153 is created). In such examples, when target file system 150 creates a new m-node in the target m-node container 152 that is not an m-node being replicated from another file system (i.e., a "non-replication m-node" herein), target file system 150 may include the target replication set ID 153 in the m-node ID of the newly created m-node.

In some examples, command 290 may include a source m-node container ID 174. In such examples, instructions 122 may directly or indirectly create a mapping 216 of source m-node container ID 174 to target m-node container ID 184, since target m-node container 152 replicates source m-node container 132. Instructions 122 may directly or indirectly store mapping 216 as a part of translation information 215 stored in target file system 150. In examples described herein, translations of m-node IDs between file systems may be performed based on m-node container ID mappings alone, without any stored mapping of each m-node ID from one file system to each m-node ID of a replicated m-node on another file system. As such, in examples described herein, the source m-node container ID to target m-node container ID mappings may be sufficient for instructions 123 to perform source m-node ID to target m-node ID translations in accordance with examples described herein. In such examples, the translation information 215 may exclude any mapping of entire source m-node IDs to entire target m-node IDs (e.g., may omit storing such an individual mapping for each replicated m-node).

As described above in relation to FIG. 1, instructions 122 may acquire an indication 190 to replicate a file system object of source file system 130 on target file system 150. The indication 190 may comprise a source m-node ID 170 identifying source m-node 135 representing the file system object in source file system 130. As described above, source m-node ID 170 may comprise a source replication set ID 172, a source m-node container ID 174, and at least one local ID 176.

In some examples, in response to acquisition of indication 190, instructions 123 may translate source m-node ID 170 to a target m-node ID 180. In some examples, as part of the translation, instructions 123 may determine the appropriate target m-node container ID 184 that is to replace source m-node container ID 174 based on translation information 215, including the mapping 216 of source m-node container ID 174 to target m-node container ID 184. In response to the determination, instructions 123 may further, as part of the translation, replace source m-node container ID 174 of source m-node ID 170 with the determined target m-node container ID 184 in target m-node ID 180. In the translation, instructions 123 may also maintain replication set ID 172 and the at least one local ID 176 of source m-node ID 170, such that the replication set ID 172 and the at least one local ID 176 remain in target m-node ID 180.

In such examples, as shown in the example of FIG. 2, instructions 123 may translate source m-node ID 170 including source replication set ID 172, source m-node container ID 174, and local ID(s) 176 to a target m-node ID including source replication set ID 172, target m-node container ID 184, and local ID(s) 176. A numerical example is described above in relation to FIG. 1.

In some examples, instructions 124 may directly or indirectly create a target m-node 155 identified by target m-node ID 180 in the target m-node container 152, as described above. In some examples, indication 190 may further comprise content of the file system object represented by source m-node 135. In such examples, instructions 124 may further directly or indirectly store the content of the file system object in target file system 150 in association with the created target m-node 155 identified by target m-node ID 180. For example, the storage location(s) of the replicated file system object in target file system 150 may be stored in target m-node 155. In other examples, other source m-nodes of source m-node container 132 (e.g., source m-node 134) may be replicated to target m-node container 152 as other target m-nodes (including, e.g., target m-node 154).

In the example of FIG. 2, instructions 122-124 may also perform M-to-1 replication in which replication is performed from multiple different source file systems 130 and 140 to a single target file system 150. In such examples, instructions 122-124 may replicate a source m-node container 132 to target m-node container 152 of target file system 150 as described above, and may replicate a source m-node container 142 to target file system 150 as described below.

Computing environment 205 may include another source file system 140, which may be implemented on computing device(s) separate from computing device 100, and which may communicate with computing device 100 via respective network interface devices. Source file system 140 may include source m-node container 142, which may include a source m-node container ID 141 that uniquely identifies source m-node container 142 in source file system 140, a replication set ID 143, and a plurality of source m-nodes 144, 145, etc. In some examples, source file system 140 may include additional source m-node container(s).

In such examples, instructions 122 may acquire another command 291 to replicate, on target file system 150, another source m-node container 142 from source file system 140. The command 291 may include another source m-node container ID 141 identifying m-node container 142 and another target replication set ID 143. In such examples, source m-node container 142 may be part of a different replication set than the replication set including m-node containers 132 and 152.

In response to command 291, instructions 122 may directly or indirectly create, in target file system 150, another target m-node container 162 identified by another target m-node container ID 161 uniquely identifying the target m-node container 162 in target file system 150, directly or indirectly create a mapping 217 of source m-node container ID 141 to target m-node container ID 151, which it may store in translation information 215 in target file system 150, as described above in relation to target m-node container 152. Instructions 122 may further directly or indirectly associate target replication set ID 163 acquired in command 291 with target m-node container 162, as described above.

In such examples, instructions 122 may further acquire another indication 192 to replicate a file system object of file system 140 on target file system 150, the indication 192 comprising an m-node ID 147 including source m-node container ID 141 for source m-node container 142. In such examples, in response to indication 291, instructions 123 may translate m-node ID 147 to a target m-node ID 167, as described above. For example, the translation may include replacement of source m-node container ID 141 with target m-node container ID 161 in target m-node ID 167 and maintaining each other portion of m-node ID 147 in target m-node ID 167, as described above in relation to the translation of target m-node ID 180.

In some examples, instructions 124 may directly or indirectly create a target m-node 165 identified by target m-node ID 167 in the target m-node container 162, as described above. In some examples, indication 192 may further comprise content of the file system object represented by source m-node 145. In such examples, instructions 124 may further directly or indirectly store the content of the file system object in target file system 150 in association with the created target m-node 165 identified by target m-node ID 167. For example, the storage location(s) of the replicated file system object in target file system 150 may be stored in target m-node 165. In other examples, other source m-nodes of source m-node container 142 (e.g., source m-node 144) may be replicated to target m-node container 162 as other target m-nodes (including, e.g., target m-node 164).

As a numerical example for the above-described M-to-1 replication process, in the example of FIG. 2, each m-node ID may have a format such as <replication set ID|m-node container ID|segment ID|location ID|generation ID>. In the example of FIG. 2, m-node IDs 170 and 147 may be the same, since they may be unique within their respective file systems, but may not be unique across different file systems. For example, source m-node ID may have a value of "00000" (e.g., where source replication set ID 172 is "0", source m-node container ID 174 is "0", and local IDs 176 include a segment ID "0", a location ID "0", and a generation ID "0"), and source m-node ID 147 may also have a value of "00000" (e.g., where source replication set ID 143 is "0", source m-node container ID 141 is "0", and local IDs include a segment ID "0", a location ID "0", and a generation ID "0"). The replication set IDs may collide as the source m-node containers 132 and 142 are not part of the same replication set, and the source m-node container IDs may collide as they do not identify m-node containers of the same file system. As such, these identical m-node IDs could be at risk of colliding when both corresponding m-nodes are replicated to target file system 150 if they are left unchanged.

However, as described above in relation to FIG. 2, source m-node 135 may be replicated by a target m-node 155 in target m-node container 152 and represented by a translated target m-node ID having a value of "11000" for example (e.g., where target replication set ID 153 is "1", target m-node container ID 184 is "0", and local IDs 176 include segment ID "0", location ID "0", and generation ID "0"). Further, source m-node 145 may be replicated by a target m-node 165 in target m-node container 162 and represented by a translated target m-node ID having a value of "12000" for example (e.g., where target replication set ID 163 is "1", target m-node container ID 161 is "2", and the local IDs include segment ID "0", location ID "0", and generation ID "0"). In this manner, m-node IDs 180 and 167 do not collide, as they differ at least in the m-node container ID portion of the m-node ID. In some examples, functionalities described herein in relation to FIG. 2 may be provided in combination with functionalities described herein in relation to any of FIGS. 1 and 3-5.

Figure 3:
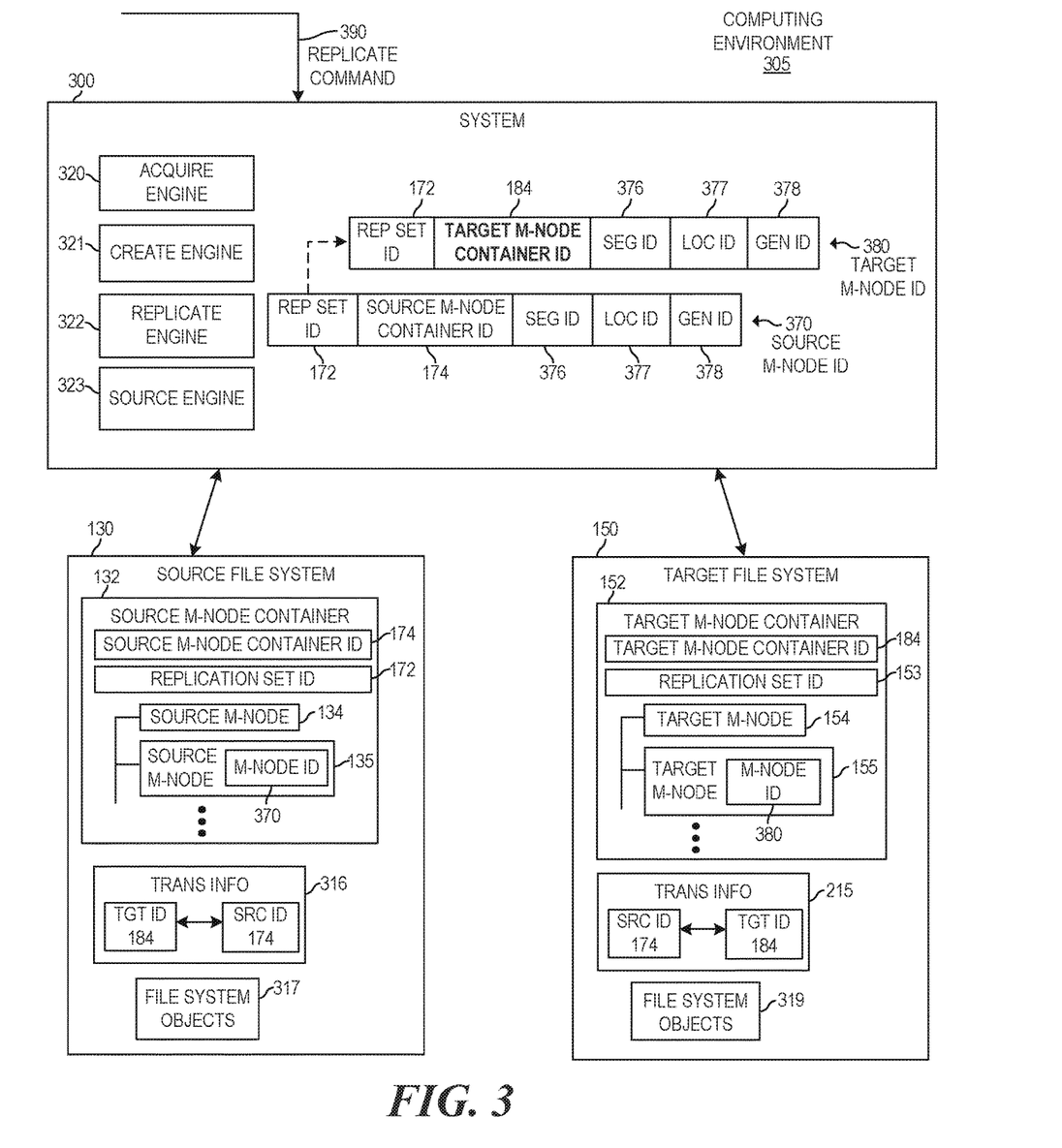
FIG. 3 is a block diagram of an example computing environment to replicate source m-nodes with respective target m-nodes in a target m-node container.

FIG. 3 is a block diagram of an example computing environment 305 to replicate source m-nodes with respective target m-nodes in a target m-node container. In the examples of FIG. 3, computing environment 305 may include a system 300, a source file system 130, and a target file system 150. System 300 may be implemented by at least one computing device and may include at least engines 320-232, which may be any combination of hardware and programming to implement the functionalities of the engines described herein. In In the example of FIG. 3, source file system 130 may be as described above in relation to FIG. 2, but additionally including translation information 316, and illustrating file system objects 317. The source m-node container 132 may include source m-nodes (e.g., 134, 135, etc.) representing respective file system objects of file system objects 317 stored on source file system 130. The source m-nodes may be identified by respective source m-node IDs, each of the source m-node IDs comprising a source replication set ID, a source m-node container ID, and at least one respective local ID. In some examples, for each source m-node ID of each source m-node, the at least one respective local ID comprises a segment ID, a location ID identifying a storage location where the source m-node was created, and a generation ID.

For example, source file system 130 may be implemented by a first storage server comprising a first storage device identified by a first segment ID 376 and storing source m-nodes of source m-node container 132. In such examples, a source m-node ID 370 identifying source m-node 135 may include a replication set ID 172, a source m-node container ID 174, and local IDs including segment ID 376, a location ID 377 identifying a storage location where source m-node 135 was created, and a generation ID 378.

In the example of FIG. 3, engine 320 may acquire a command 390 to replicate source m-node container 132 of source file system 130 on a target file system 150. In the example of FIG. 3, target file system 150 may be as described above in relation to FIG. 2, including at least a portion of translation information 215. In some examples, target file system 150 may be implemented by a second storage server comprising a second storage device identified by a second segment ID (which may be different than the first segment ID 376) and storing target m-nodes of target m-node container 152.

In response to command 390, engine 321 may create, in target file system 150, a target m-node container 152 associated with a target m-node container ID 184 that uniquely identifies target m-node container 152 among any other m-node containers of target file system 150. Also in response to command 390, engine 321 may store target translation information 215 mapping source m-node container ID 174 (uniquely identifying source m-node container 132 in source file system 130) to target m-node container ID 183. In some examples, system 300 may maintain no mapping of any other portions of source m-node IDs to target m-node IDs, or any mapping of entire source m-node IDs to target m-node IDs, as described above in relation to FIG. 2.

In the example of FIG. 3, engine 322 may replicate each of the source m-nodes of source m-node container 132 with a respective target m-node in target m-node container 152. For example, engine 322 may replicate source m-nodes 134 and 135 with target m-nodes 154 and 155, and the like. In some examples, the replication may include, for each of the source m-nodes, engine 322 translating the source m-node ID to a respective target m-node ID to identify the target m-node, the target m-node ID being the same as the corresponding source m-node ID but with the source m-node container ID replaced with the target m-node container ID. For example, for source m-node 135 identified by source m-node ID 370, engine 322 may translate source m-node ID 370 to target m-node ID 380 such that target m-node ID 380 is the same as the corresponding source m-node ID 370 but with source m-node container ID 174 replaced with target m-node container ID 184, as indicated by the mapping of source m-node container ID 174 to target m-node container ID 184 in translation information 215, as described above. In such examples, target m-node ID 380 may include replication set ID 172, target m-node container ID 184, and local IDs including segment ID 376, location ID 377, and generation ID 378.

In some examples, engine 322 may further, for each of the source m-nodes of source m-node container 132, create a respective target m-node identified by a target m-node ID translated from the source m-node ID for the source m-node. For example, engine 322 may create target m-node 155 identified by target m-node ID 380 translated from source m-node ID 370 for source m-node 135. For each of the source m-nodes, engine 322 may further store content of a file system object associated with the source m-node in target file system 150 in association with the respective target m-node which replicates the source m-node. For example, engine 322 may store content of a file system object, among file system objects 317 and associated with source m-node 135, in target file system 150, among file system objects 319 and in association with the target m-node 155 that replicates the source m-node 135.

In the example of FIG. 3, command 390 may further include a target replication set ID 153 different than source replication set ID 172, as source m-node container 132 and target m-node container 152 may be established as part of the same replication set and may be assigned different replication set IDs, as described above. In such examples, each of the target m-node IDs translated from one of the source m-node IDs by engine 322 may include the source replication set ID, and each target m-node ID identifying a non-replicated target m-node that is created in target m-node container 152 may include target replication ID 153.

In some examples, the source m-node container 132 and the target m-node container 152 may each be part of a follow-the-sun replication set in which the m-node containers take turns being active (i.e., to create and/or update file system objects), and m-node container file system objects of the source file system are replicated to the target file system and file system objects of the target file system are replicated to the source file system In such examples, an engine 323 may store source translation information 316 on the source file system mapping target m-node container ID 184 to source m-node container ID 174. In such examples, during replication of a given target m-node of target m-node container 152 to source m-node container 132, engine 323 may translate the target m-node ID of the given target m-node to a respective source m-node ID, the respective m-node ID being the same as the corresponding target m-node ID but with the target m-node container ID replaced with the source m-node container ID, and one of update a file system object corresponding to a source m-node identified with the respective source m-node ID, or create a new source m-node identified with the respective source m-node ID.

For example, in such examples, during replication of target m-node 155 of target m-node container 152 to source m-node container 132, engine 323 may translate target m-node ID 380 to source m-node ID 380 based on the translation information 316, the translated source m-node ID 380 being the same as the target m-node ID 370, but with target m-node container ID 184 replaced with the source m-node container ID 174, as indicated by translation information 316. Also during the replication, engine 323 may one of update a file system object corresponding to a source m-node identified with the translated source m-node ID 380 (i.e., if an m-node identified by ID 380 already exists in source m-node container 132), or create a new source m-node identified with the translated source m-node ID 380 (i.e., if no m-node identified by ID 380 exists in source m-node container 132). In some examples, engine 322 may replicate m-nodes in response to indications including source m-node IDs identifying source m-nodes to be replicated, as described above in relation to FIGS. 1 and 2.

As noted above, system 300 may be implemented by at least one computing device and may include at least engines 320-232, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In such examples, the at least one machine-readable storage medium may store instructions that, when executed by the at least one processing resource, implement the engines of system 300. In such examples, system 300 may include the at least one machine-readable storage medium storing the instructions and the at least one processing resource to execute the instructions, or one or more of the at least one machine-readable storage medium may be separate from but accessible to system 300 and the at least one processing resource (e.g., via a computer network). In some examples, the hardware and programming implementing engines 320-323 may be divided among multiple computing devices.

In some examples, the instructions can be part of an installation package that, when installed, can be executed by the at least one processing resource to implement at least the engines of system 300. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 300 including the processing resource. In such examples, the machine-readable storage medium may include memory such as a hard drive, solid state drive, or the like. In other examples, the functionalities of any engines of system 300 may be implemented in the form of electronic circuitry. System 300 may also include a network interface device, as described above, to communicate with other components via a network.

In some examples, at least engines 320-322 of system 320 may be implemented on the same computing device(s) as target file system 150. For example, target file system 150 may be implemented by one or more computing device(s) (e.g., including at least one server and storage device(s)), and at least engines 320-322 may be implemented on one of the computing device(s) at least partially implementing target file system 150. In some examples, at least engine 323 of system 320 may be implemented on the same computing device(s) as source file system 130. For example, source file system 130 may be implemented by one or more computing device(s) (e.g., including at least one server and storage device(s)), and at least engine 323 may be implemented on one of the computing device(s) at least partially implementing source file system 130. In some examples, functionalities described herein in relation to FIG. 3 may be provided in combination with functionalities described herein in relation to any of FIGS. 1-2 and 4-5.

Figure 4:
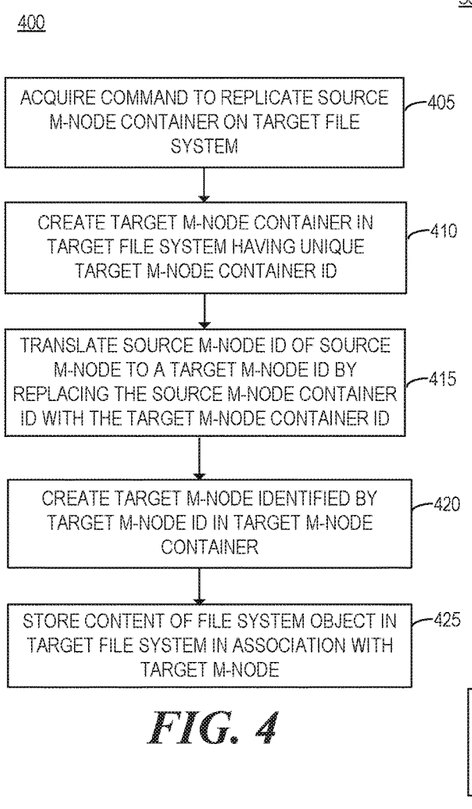
FIG. 4 is a flowchart of an example method for translating a source m-node ID of a source m-node to a target m-node ID.

FIG. 4 is a flowchart of an example method 400 for translating a source m-node ID 170 of a source m-node 135 to a target m-node ID 180. Although execution of method 400 is described below with reference to computing device 100 of FIG. 2, other suitable computing devices for the execution of method 400 can be utilized (e.g., computing device 100 of FIG. 1, system 300 of FIG. 3). Additionally, implementation of method 400 is not limited to such examples.

At 405 of method 400, instructions 122 may acquire a command to replicate a source m-node container 132 of a source file system 130 on a target file system 150. As described above, the source m-node container 132 may include a source m-node 135 representing a file system object and identified by a source m-node ID 170 comprising a source replication set ID, a source m-node container ID, and at least one local ID. At 410, instructions 122 may create in the target file system 150, a target m-node container 152 having a target m-node container ID 184 that uniquely identifies the target m-node container 152 among any other m-node containers of target file system 150.

At 415, instructions 123 may translate source m-node ID 170 to a target m-node ID 180 by replacing the source m-node container ID 174 of source m-node ID 170 with target m-node container ID 184 while maintaining the source replication set ID 172 and the at least one local ID 176 of source m-node ID 170 in target m-node ID 180, as described above. At 420, instructions 124 may create a target m-node 155, identified by the target m-node ID 180, in target m-node container 184. At 425, instructions 124 may store content of the file system object represented by source m-node 135 in target file system 150 in association with target m-node 155, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
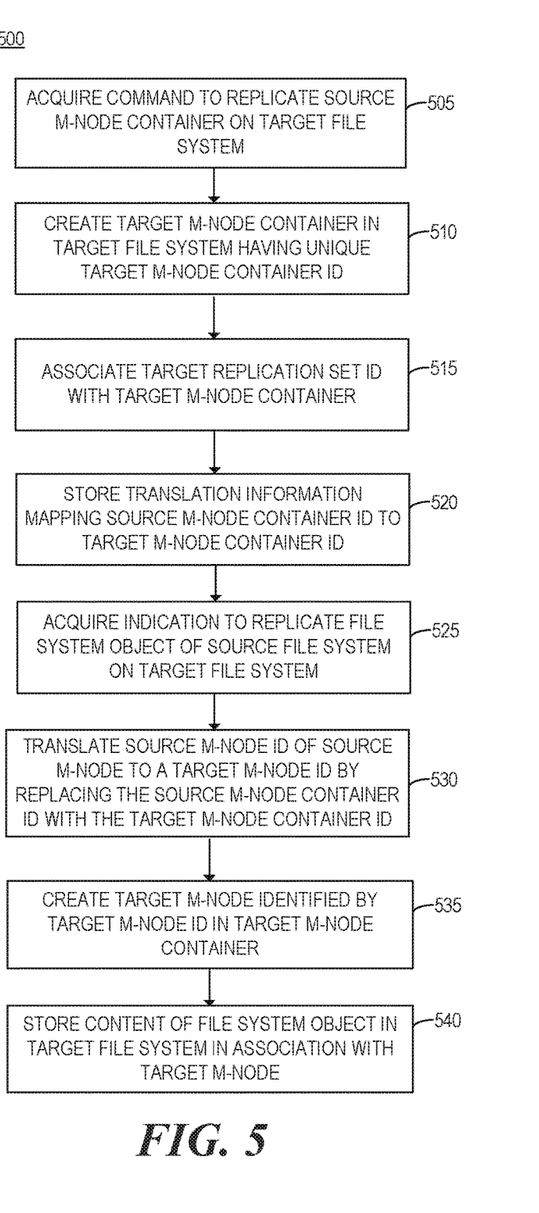
FIG. 5 is a flowchart of an example method for storing translation information mapping a source m-node container ID to a target m-node container ID.

FIG. 5 is a flowchart of an example method 500 for storing translation information mapping a source m-node container ID to a target m-node container ID. Although execution of method 500 is described below with reference to computing device 100 of FIG. 2, other suitable computing devices for the execution of method 500 can be utilized (e.g., computing device 100 of FIG. 1, system 300 of FIG. 3). Additionally, implementation of method 500 is not limited to such examples.

At 505 of method 500, instructions 122 may acquire a command 190 to replicate a source m-node container 132 of a source file system 130 on a target file system 150. As described above, the source m-node container 132 may include a source m-node 135 representing a file system object and identified by a source m-node ID 170 comprising a source replication set ID, a source m-node container ID, and at least one local ID. At 510, instructions 122 may create in the target file system 150, a target m-node container 152 having a target m-node container ID 184 that uniquely identifies the target m-node container 152 among any other m-node containers of target file system 150.

At 515, in association with the creation of the target m-node container 152, instructions 122 may associate a target replication set ID 153, included in command 190, with target m-node container 152 in target file system 152. At 520, also in association with the creation of m-node container 152, instructions 122 may store translation information 215 mapping source m-node container ID 174, uniquely identifying the source m-node container in the source file system, to target m-node container ID 184. Although 515 and 520 are illustrated as separate from 510, in some examples, 515 and 520 may be performed as part of the functionalities described in relation to 510.

At 525, instructions 122 may acquire an indication to replicate a file system object of source file system 130 on target file system 150, the indication comprising content of the file system object and source m-node ID 170 identifying the source m-node 135 representing the file system object in source file system 130. At 530, in response to acquiring indication 190, instructions 123 may translate source m-node ID 170 to a target m-node ID 180 by replacing the source m-node container ID 174 of source m-node ID 170 with target m-node container ID 184 while maintaining the source replication set ID 172 and the at least one local ID 176 of source m-node ID 170 in target m-node ID 180, as described above. At 535, instructions 124 may create a target m-node 155, identified by the target m-node ID 180, in target m-node container 184. At 540, instructions 124 may store content of the file system object represented by source m-node 135 in target file system 150 in association with target m-node 155, as described above.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by a processing resource to:

acquire an indication to replicate a file system object of a source file system on a target file system, the indication comprising a source m-node identifier (ID) identifying a source m-node representing the file system object in the source file system, the source m-node ID comprising a source replication set ID, a source m-node container ID identifying a source m-node container of the source file system including the source m-node, and at least one local ID;

translate the source m-node ID to a target m-node ID, the translation including replacement of the source m-node container ID of the source m-node ID with a target m-node container ID identifying a target m-node container of the target file system and maintaining, in the target m-node ID, the replication set ID and the at least one local ID of the source m-node ID; and create a target m-node identified by the target m-node ID in the target m-node container.

2. The article of claim 1, wherein the instructions to translate comprise instructions to:

determine the target m-node container ID that is to replace the source m-node container ID based on translation information including a mapping of the source m-node container ID, which uniquely identifies the source m-node container in the source file system, to the target m-node container ID, which uniquely identifies the target m-node container in the target file system.

3. The article of claim 2, wherein:

the translation information excludes any mapping of the entire source m-node ID to the entire target m-node ID; and the instructions to create comprises instructions to store content of the file system object in the target file system in association with the target m-node.

4. The article of claim 2, wherein the instructions to acquire the indication comprise instructions to:

acquire a command to replicate the source m-node container on the target file system, the command comprising the source m-node container ID and a target replication set ID for the target m-node container; and in response to the command:

create the target m-node container identified by the target m-node container ID, in the target file system;

create the mapping of the source m-node container ID to the target m-node container ID; and associate the target replication set ID with the target m-node container such that the target replication set ID is included in the m-node ID of each non-replication m-node created in the target m-node container.

5. The article of claim 4, wherein the instructions to acquire the indication comprise instructions to:

acquire another command to replicate, on the target file system, another source m-node container from another file system, the command comprising another source m-node container ID identifying the another m-node container and another target replication set ID; and in response to the another command:

create, in the target file system, another target m-node container identified by another target m-node container ID uniquely identifying the another target m-node container in the target file system;

create a mapping of the another source m-node container ID to the another target m-node container ID; and associate the another target replication set ID with the another target m-node container.

6. The article of claim 5, wherein:

the instructions to acquire comprise instructions to acquire another indication to replicate another file system object of the another file system on the target file system, the another indication comprising a given m-node ID including the another source m-node container ID; and the instructions to translate comprise instructions to, in response to the another indication, translate the given m-node ID to another target m-node ID, the translation including replacement of the another source m-node container ID with the another target m-node container ID and maintaining each other portion of the given m-node ID in the another target m-node ID.

7. A system comprising:

an acquire engine to acquire a command to replicate a source m-node container of a source file system on a target file system, the source m-node container including source m-nodes representing respective file system objects and identified by respective source m-node identifiers (IDs), each of the source m-node IDs comprising a source replication set ID, a source m-node container ID, and at least one respective local ID;

a create engine to, in response to the command, create in the target file system a target m-node container associated with a target m-node container ID that uniquely identifies the target m-node container among any other m-node containers of the target file system; and a replicate engine to replicate each of the source m-nodes with a respective target m-node in the target m-node container, including, for each of the source m-nodes, translation of the source m-node ID to a respective target m-node ID to identify the target m-node, the target m-node ID being the same as the corresponding source m-node ID but with the source m-node container ID replaced with the target m-node container ID.

8. The system of claim 7, wherein:

the create engine is further to store target translation information mapping the source m-node container ID, uniquely identifying the source m-node container in the source file system, to the target m-node container ID, and the system maintains no mapping of any other portions of the source m-node IDs to the target m-node IDs, or any mapping of entire source m-node IDs to target m-node IDs.

9. The system of claim 7, wherein:

the replicate engine is further to, for each of the source m-nodes, create the respective target m-node identified by the target m-node ID translated from the source m-node ID for the source m-node; and the replicate engine is further to, for each of the source m-nodes, store, in the target file system in association with the respective target m-node, content of a file system object associated with the source m-node.

10. The system of claim 7, wherein:

the command is further to include a target replication set ID different than the source replication set ID; and each of the target m-node IDs translated from one of the source m-node IDs includes the source replication set ID, and each target m-node ID identifying a non-replicated target m-node created in the target m-node container includes the target replication ID.

11. The system of claim 9, wherein:

the target m-node container is part of a follow-the-sun replication set in which file system objects of the source file system are replicated to the target file system and file system objects of the target file system are replicated to the source file system; and the system further comprises a source engine to store source translation information on the source file system mapping the target m-node container ID to the source m-node container ID; and during replication of a given target m-node of the target m-node container to the source m-node container, the source engine is further to:

translate the target m-node ID of the given target m-node to a respective source m-node ID, the respective m-node ID being the same as the corresponding target m-node ID but with the target m-node container ID replaced with the source m-node container ID; and one of update a file system object corresponding to a source m-node identified with the respective source m-node ID, and create a new source m-node identified with the respective source m-node ID.

12. The system of claim 7, wherein:

the source file system is implemented by a first storage server comprising a first storage device identified by a first segment ID and storing source m-nodes of the source m-node container;

the target file system is implemented by a second storage server comprising a second storage device identified by a second segment ID and storing target m-nodes of the target m-node container; and for each source m-node ID of each source m-node, the at least one respective local ID comprises the first segment ID, a location ID identifying a storage location where the source m-node was created, and a generation ID.

13. A method comprising:

acquiring a command to replicate a source m-node container of a source file system on a target file system, the source m-node container including a source m-node representing a file system object and identified by a source m-node identifier (ID) comprising a source replication set ID, a source m-node container ID, and at least one local ID;

creating, in the target file system, a target m-node container having a target m-node container ID that uniquely identifies the target m-node container among any other m-node containers of the target file system;

translating the source m-node ID to a target m-node ID by replacing the source m-node container ID of the source m-node ID with the target m-node container ID while maintaining the source replication set ID and the at least one local ID of the source m-node ID in the target m-node ID;

creating a target m-node identified by the target m-node ID in the target m-node container; and storing content of the file system object in the target file system in association with the target m-node.

14. The method of claim 13, further comprising:

acquiring an indication to replicate the file system object of the source file system on the target file system, the indication comprising content of the file system object and the source m-node ID identifying the source m-node representing the file system object in the source file system; and performing the translating in response to acquiring the indication.

15. The method of claim 14, wherein the creating the target m-node container comprises:

associating a target replication set ID, included in the command, with the target m-node container in the target file system; and storing translation information mapping the source m-node container ID, uniquely identifying the source m-node container in the source file system, to the target m-node container ID.

* * * * *